US012584464B2

(12) United States Patent
Gong et al.

(10) Patent No.: US 12,584,464 B2
(45) Date of Patent: Mar. 24, 2026

(54) LIGHTNING PROTECTION APPARATUS FOR WIND GENERATOR BLADE AND MOUNTING METHOD THEREOF

(71) Applicant: ENVISION ENERGY CO., LTD, Jiangsu (CN)

(72) Inventors: Shichang Gong, Jiangsu (CN); Hao Ma, Jiangsu (CN); Jianxu Sun, Jiangsu (CN); Jiayan Bian, Jiangsu (CN); Zhenhua Dong, Jiangsu (CN)

(73) Assignee: ENVISION ENERGY CO., LTD, Jiangsu (CN)

( * ) Notice: Subject to any disclaimer, the term of this patent is extended or adjusted under 35 U.S.C. 154(b) by 0 days.

(21) Appl. No.: 18/727,696

(22) PCT Filed: Jan. 10, 2022

(86) PCT No.: PCT/CN2022/070923
§ 371 (c)(1),
(2) Date: Jul. 10, 2024

(87) PCT Pub. No.: WO2023/130424
PCT Pub. Date: Jul. 13, 2023

(65) Prior Publication Data
US 2025/0101955 A1     Mar. 27, 2025

(51) Int. Cl.
F03D 80/30        (2016.01)
F03D 13/10        (2016.01)

(52) U.S. Cl.
CPC ........... F03D 80/301 (2023.08); F03D 80/30 (2016.05); F03D 13/10 (2016.05)

(58) Field of Classification Search
CPC ......... F03D 80/301; F03D 80/30; F03D 13/10
See application file for complete search history.

(56) References Cited

U.S. PATENT DOCUMENTS 11,060,508 B2 *   7/2021  Dahl ...................... F03D 80/30
2012/0043979 A1   2/2012  Jakobsen et al.
(Continued)

FOREIGN PATENT DOCUMENTS

CN      201679646      12/2010
CN      102918262      2/2013
(Continued)

OTHER PUBLICATIONS

"International Search Report (Form PCT/ISA/210) of PCT/CN2022/070923", mailed on Oct. 10, 2022, with English translation thereof, pp. 1-5.
(Continued)

*Primary Examiner* — Courtney D Heinle
*Assistant Examiner* — Andrew J Marien
(74) *Attorney, Agent, or Firm* — USCH Law, PC

(57)                    ABSTRACT
A lightning protection apparatus for a wind generator blade, including a lightning arrester and a lightning arrester base. The lightning arrester includes a connecting portion, a lightning arresting portion, and a positioning portion, wherein the lightning arresting portion is configured to arrest a lightning, an external thread is formed on a surface of the connecting portion and configured to be connected to the lightning arrester base, and the positioning portion is disposed between the connecting portion and the lightning arresting portion, such that after the connecting portion is screwed into a threaded hole, the positioning portion can fit with a recess in the threaded hole in shape. The lightning arrester base is configured to be connected to the lightning arrester and lead out a lightning current received by the lightning arrester during lightning arresting, and includes an insulation layer and at least one the threaded hole.

15 Claims, 5 Drawing Sheets

(56) References Cited

U.S. PATENT DOCUMENTS

| | | | |
|---|---|---|---|
| 2016/0258423 A1 | 9/2016 | Whitehouse et al. | |
| 2016/0298608 A1* | 10/2016 | Whitehouse | F03D 80/30 |
| 2018/0094621 A1* | 4/2018 | Olsen | F03D 80/30 |
| 2020/0095983 A1* | 3/2020 | Girschig | F03D 80/507 |
| 2020/0355164 A1* | 11/2020 | Christiansen | F03D 80/301 |

FOREIGN PATENT DOCUMENTS

| | | |
|---|---|---|
| CN | 203022979 | 6/2013 |
| CN | 106626182 | 5/2017 |
| CN | 107429672 | 12/2017 |
| CN | 109623460 A | 4/2019 |
| CN | 208778151 U | 4/2019 |
| CN | 208778152 U | 4/2019 |
| CN | 110454335 | 11/2019 |
| CN | 210859068 U | 6/2020 |
| CN | 212838186 | 3/2021 |
| CN | 112796935 A | 5/2021 |
| CN | 113323822 | 8/2021 |
| CN | 113323822 A | 8/2021 |
| CN | 113833616 A | 12/2021 |
| JP | 2017538255 | 12/2017 |

OTHER PUBLICATIONS

"Written Opinion of the International Searching Authority (Form PCT/ISA/237) of PCT/CN2022/070923", mailed on Oct. 10, 2024, pp. 1-4.

Envision Energy Co., Ltd, EP Search Report, EP22917896.7, Jan. 13, 2025, 14 pgs.

Envision Energy Co., Ltd, CN First Examination Report with English Translation, CN 202280000185.9, Mar. 29, 2025, 14 pgs.

Envision Energy Co., Ltd., Chilean First Examination Report with English Translation, CL202402077, Oct. 2, 2025, 30 pgs.

Envision Energy Technology Pte Ltd., Chinese First Examination Report with English Translation, CN202280000185.9, Jul. 19, 2025, 14 pgs.

Envision Energy Co., Ltd., Canadian First Office Action, CA3248033, Jan. 26, 2026, 8 pgs.

* cited by examiner

LIGHTNING PROTECTION APPARATUS FOR WIND GENERATOR BLADE AND MOUNTING METHOD THEREOF

CROSS-REFERENCE TO RELATED APPLICATION

This application is a 371 of international application of PCT application serial no. PCT/CN2022/070923, filed on Jan. 10, 2022. The entirety of the above-mentioned patent application is hereby incorporated by reference herein and made a part of this specification.

FIELD OF TECHNOLOGY

The present invention relates to the field of wind power technologies, in particular to a lightning protection apparatus for a wind generator blade and a mounting method thereof.

TECHNICAL BACKGROUND

With the development of wind power technology, the unit capacity of a wind generator set is constantly expanding. In order to meet the constantly expanding unit capacity, wind generator blades are also increasing in size and heightened, thereby increasing the overall height of the wind generator set. At present, the top height of a wind generator blade is generally about 100 meters, even up to 200 meters. In addition, because of wind resource distribution, wind farms are generally located in high mountains or coastal or offshore areas with relatively open terrain. Therefore, wind generator sets become protruding objects in these areas because of their own height, making them susceptible to lightning strikes. If proper lightning protection measures are not taken, lightning strikes will easily cause damage to wind generator sets, especially wind generator blades.

Currently, lightning protection is implemented in most of wind generator blades by disposing lightning arresters and lightning protection down leads on the wind generator blades. However, lightning arresters for existing wind generator blades have some defects. For example, lightning arresters and lightning arrester bases are mostly connected by bolts, which is prone to flashover, such that a high temperature is created at contact parts between the lightning arresters and the lightning arrester bases to cause melting, even blade burn and other hazards. In view of this problem, a lightning protection apparatus is disclosed in each of the patents CN107429672A and CN113323822A, in which a lightning arrester is attached to the end surface of a base to reduce a current passing through a bolt or a threaded rod for connecting the lightning arrester to the base. But such lightning protection apparatus still has some defects, mainly in that the lightning arrester of the lightning protection apparatus is often difficult to accurately position during mounting, which is likely to cause accidental drilling to damage the wind generator blade.

SUMMARY OF THE INVENTION

In view of some or all of the problems in the prior art, on the one hand, the present invention provides a lightning protection apparatus for a wind generator blade, including:
a lightning arrester, including:
a lightning arresting portion configured to arrest a lightning;

a connecting portion configured to be connected to a lightning arrester base, where the connecting portion is provided with an external thread; and
a positioning portion disposed between the connecting portion and the lightning arresting portion, wherein the positioning portion is constructed so that after the connecting portion is screwed into a threaded hole, the positioning portion is capable of fitting with a recess in the threaded hole in shape; and
the lightning arrester base configured to be connected to the lightning arrester and lead out a lightning current received by the lightning arrester during lightning arresting, wherein the lightning arrester base includes:
an insulation layer disposed on a surface of the lightning arrester base; and
at least one the threaded hole formed on a base surface of the lightning arrester base facing the wind generator blade, wherein a length direction of the threaded hole is perpendicular to the base surface, the threaded hole fits with the external thread, and the recess capable of fitting with the positioning portion in shape is provided at an end part of the threaded hole close to the base surface.

Further, a magnetic body is disposed at a position of the threaded hole.

Further, the lightning arrester base includes:
a base body on which the at least one threaded hole is formed; and
a lead tube disposed on a side surface of the base body, forming a smooth transition, and configured to be connected to a down lead.

Further, the lightning arresting portion of the lightning arrester is provided with a mounting hole.

Further, the base body is cylindrical.

Further, the lead tube is cylindrical.

Further, a cross section of the positioning portion and a cross section of the recess are stepped, serrated, or wavy.

Further, the mounting hole is an inner hexagonal mounting hole.

Further, a sectional area of the connecting portion of the lightning arrester is less than a sectional area of the lightning arresting portion.

Further, there is an angle between the base surface and an axis of the lightning arrester base, and the angle is determined based on a mounting position of the lightning arrester base.

Further, the base surface is parallel to an inner surface of the wind generator blade in contact therewith.

Further, at least one protrusion is disposed on a surface of the insulation layer in contact with the wind generator blade.

Further, the lead tube includes a down lead crimping hole, wherein the down lead is crimped in the down lead crimping hole.

On the other hand, the present invention provides a mounting method for the lightning protection apparatus as described above, including:
during infusion of the wind generator blade, mounting the lightning arrester base inside the wind generator blade;
after the wind generator blade is demolded, positioning the threaded hole outside the wind generator blade;
forming a first through hole on a position of the wind generator blade corresponding to the threaded hole, a diameter of the first through hole is greater than or equal to the sectional area of the lightning arresting portion of the lightning arrester;
forming a second through hole on the insulation layer of the lightning arrester base through the first through hole, a diameter of the second through hole is greater than or equal to the sectional area of the lightning arresting portion of the lightning arrester; and mounting the lightning arrester in the threaded hole of the lightning arrester base, such that the positioning portion of the lightning arrester fits with the recess of the threaded hole in shape.

Further, the positioning of the threaded hole includes:

determining a position of the magnetic body on the lightning arrester base by using a magnet.

Further, the lightning arrester base is mounted between a suction surface and a pressure surface at a trailing edge of the wind generator blade.

Further, the lightning arrester base is bonded to the inner surface of a housing of the wind generator blade by a bonding material.

Based on the lightning protection apparatus, the present invention further provides a wind generator with a lightning protection function, wherein at least one the lightning protection apparatus as described above is mounted on a blade of the wind generator.

The present invention is based on the following insights of the inventor: most of existing lightning protection apparatuses for wind generator blades have the following defects: 1, the lightning arrester base located inside the wind generator blade has a strong capability of emitting an upward leader, such that the lightning may directly break through the housing of the wind generator blade and hit the lightning arrester base, thereby damaging the wind generator blade; 2, the lightning arrester and the lightning arrester base have a small contact area or are not in complete contact, such that when the lightning current is conducted, flashover may occur between the lightning arrester and the lightning arrester base, or the contact surface between the lightning arrester and the lightning arrester base is melted, thereby creating a high temperature to cause explosion at a connection between the lightning arrester and the lightning arrester base, and even burn the wind generator blade, or cause adhesion between the lightning arrester and the lightning arrester base, and maintenance difficulty and cost are high; and 3, an existing lightning arrester is difficultly positioned during mounting, which may also cause accidental drilling on the wind generator blade to damage the wind generator blade, or make it difficult for a surface of the lightning arrester to be completely attached to the lightning arrester base, thereby reducing the contact area between the lightning arrester and the lightning arrester base, and causing the risk of flashover. On this basis, the inventor proposes a lightning protection apparatus for a wind generator blade. First, the surface of the lightning arrester base is coated with the insulation layer to solve the problem that the lightning arrester base has a strong capability of emitting an upward leader, thereby ensuring that the lightning arrester base will not be struck by lightning, and reducing the lightning damage to the wind generator blade. Secondly, the threaded hole perpendicular to the surface of the lightning arrester base of the lightning protection apparatus is reserved on the lightning arrester base to mount the lightning arrester, and the lightning arrester integrates the connecting portion and the lightning arresting portion, which effectively ensures the mounting reliability and sufficient surface contact of the lightning arrester and the lightning arrester base, thereby avoiding the possible problems of arc discharge, flashover, melting and the like during current conduction; meanwhile, the positioning portion is disposed on the connecting portion so that the optimal connection and positioning are implemented during mounting, and the shape fit contact is formed between the connecting portion of the lightning arrester and the lightning arrester base to enlarge a contact area between the connecting portion of the lightning arrester and the lightning arrester base, and reduce a gap, such that the contact area can be enlarged while the contact precision is improved to avoid the contact gap caused by incorrect mounting, the lightning current conduction effect is improved, and the generation of an electric arc is avoided. Finally, the magnetic body is further disposed on the lightning arrester of the lightning protection apparatus, which lowers the positioning difficulty during the mounting of the lightning arrester.

DESCRIPTION OF THE DRAWINGS

To further illustrate the above and other advantages and features of the embodiments of the present invention, more specific descriptions of the embodiments of the present invention will be presented with reference to the accompanying drawings. It can be understood that these accompanying drawings only depict typical embodiments of the present invention, and therefore will not be considered as a limitation to its scope. In the accompanying drawings, for the sake of clarity, the same or corresponding components will be denoted with the same or similar signs.

DETAILED DESCRIPTION OF THE EMBODIMENTS

In the description below, the present invention is described with reference to the embodiments. However, those skilled in the art will recognize that the embodiments may be implemented without one or more specific details or in conjunction with other alternative and/or additional methods, materials, or components. In other cases, well-known structures, materials, or operations are not shown or described in detail so as not to obscure the inventive point of the present invention. Similarly, specific quantities, materials, and configurations are described for explanatory purposes in order to provide a comprehensive understanding of the embodiments of the present invention. However, the present invention is not limited to these specific details. In addition, it should be understood that the embodiments shown in the accompanying drawings are illustrative representations and are not necessarily drawn to correct scale.

In this specification, reference to "one embodiment" or "the embodiment" means that specific features, structures, or characteristics described in combination with the embodiment are included in at least one embodiment of the present invention. The phrase "in one embodiment" occurring throughout this specification does not necessarily refer to the same embodiment.

It is to be noted that the embodiment of the present invention describes the process steps in a specific order, but this is only for the purpose of describing the specific embodiment, rather than defining the sequence of the steps. On the contrary, in different embodiments of the present invention, the sequence of the steps may be adjusted according to the adjustment of the process.

Figure 1:
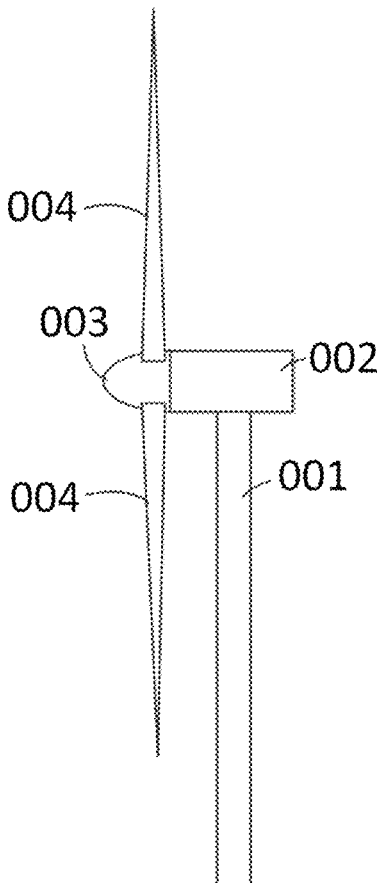
FIG. 1 shows a schematic structural diagram of a wind generator according to one embodiment of the present invention.

FIG. 1 shows a schematic diagram of a wind generator to which the present invention is applied. As shown in FIG. 1, the wind generator includes a tower 001, and a nacelle 002 connected to the tower 001 and supporting a hub 003. Two or more wind generator blades 004 are arranged on the hub 003, wherein the wind generator blades 004 drive a rotor (not shown) arranged in the hub 003 to rotate about an axis (not shown) under the action of wind, and the rotation of the rotor of a power generator relative to a stator will cause electrical energy to be generated. As shown in the figure, the wind generator blades are usually located at a highest point of the wind generator and therefore are also the most vulnerable parts to lightning strikes. Accordingly, in the wind generator, corresponding lightning protection apparatuses are usually disposed in the wind generator blades. However, even if the lightning protection apparatuses are mounted in the wind generator blades of an existing wind generator, blade damage will still be caused.

The main reason for the wind generator blade damage is that the lightning protection apparatus usually includes two parts: a lightning arrester and a lightning arrester base, wherein the lightning arrester is partially located on a surface of the wind generator blade and has a bottom connected to the lightning arrester base, and the bottom of the lightning arrester is mounted inside the wind generator blade. However, due to the limitations of a manufacturing process for the wind generator blade, usually the lightning arrester base and the lightning arrester cannot be mounted at the same time, which may result in unstable contact between the lightning arrester and the lightning arrester base. This can lead to the possibility of flashover or melting of a contact surface between the lightning arrester and the lightning arrester base due to a high temperature during conduction of a lightning current when the wind generator blade is struck by a lightning, thereby damaging the wind generator blade.

Figure 2:
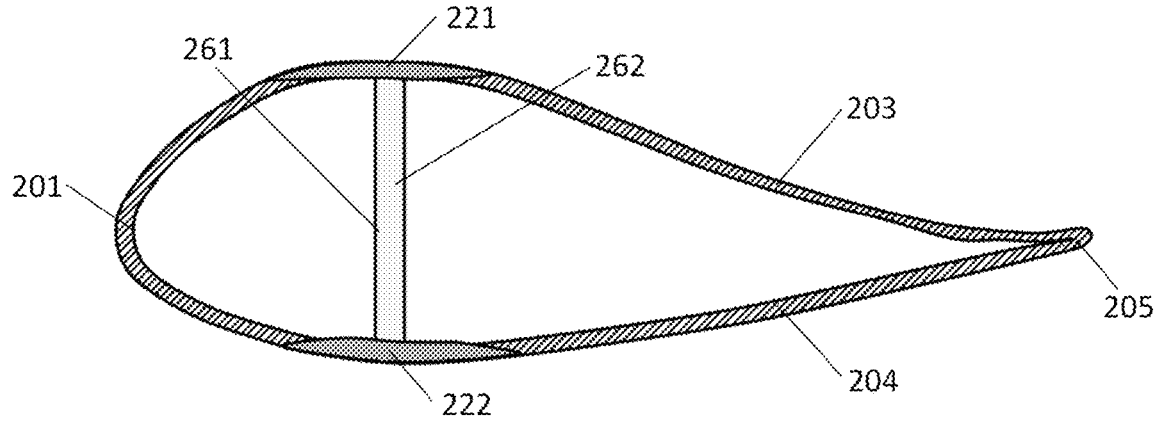
FIG. 2 shows a schematic interface diagram of a wind generator blade according to one embodiment of the present invention.

Specifically, FIG. 2 shows a schematic structural diagram of a wind generator blade according to one embodiment of the present invention. As shown in FIG. 2, the wind generator blade includes a leading edge 201, main spars 221 and 222, a pressure surface 203, a suction surface 204, and a trailing edge 205, and two webs 261 and 262 are fixed between the two main spars 221 and 222, wherein the main spars, the webs, the pressure surface, the suction surface, and the trailing edge include upper and lower skins and sandwich structures. In general, the wind generator blade is integrally formed by means of lay-up and infusion. Therefore, when another component or structure, such as the lightning arrester base, needs to be disposed or mounted inside the wind generator blade, the component or structure usually needs to be mounted in advance during the infusion of the wind generator blade, then the lightning arrester base is positioned after the wind generator blade is demolded, and the wind generator blade is drilled to complete the mounting of the lightning arrester.

At present, the lightning arrester base is generally positioned in a manner that a metal detector is used to detect from the outside of a housing of the wind generator blade, but the position of the lightning arrester base is often difficult to accurately position due to the influence of metal of a conductor of a down lead and the thickness of the housing of the wind generator blade, which may cause accidental drilling on the housing of the wind generator blade to damage the wind generator blade. In addition, an existing lightning arrester base is usually not attached to an inner surface of the housing of the wind generator blade, such that it is also difficult for the inner surface of the housing of the wind generator blade to be completely perpendicular to a surface of the lightning arrester base by drilling, a surface of the lightning arrester cannot be completely attached to the metal surface of the lightning arrester base, and a contact area is insufficient, or there is a certain inclined angle between a connecting bolt and the lightning arrester. As a result, the lightning arrester is unstable to mount and easy to loosen. All these problems easily cause flashover during conduction of the lightning current to damage the wind generator blade.

Furthermore, in an existing lightning protection apparatus, insulation measures are not taken for both the lightning arrester base and a bolt or a screw rod for connecting the lightning arrester to the lightning arrester base. In this way, on the one hand, a large electromagnetic force is easily generated between the lightning arrester and the lightning arrester base to damage the lightning arrester, and on the other hand, the lightning arrester base has a strong capability of emitting an upward leader, such that the lightning may directly break through the housing of the wind generator blade and hit the lightning arrester base to damage the wind generator blade.

It can be seen that in order to improve the lightning protection apparatus for the wind generator blade, the following aspects can be taken into consideration: 1, the upward leader emitting capability of the lightning arrester base is weakened; 2, the contact area between the lightning arrester and the lightning arrester base is ensured; and 3, the difficulty in mounting and positioning of the lightning arrester is lowered. The upward leader emitting capability of the lightning arrester base may be weakened, for example, by taking a corresponding insulation measure for the lightning arrester base. The contact area between the lightning arrester and the lightning arrester base may be ensured by improving a means of connection between the lightning arrester and the lightning arrester base. The difficulty in mounting and positioning of the lightning arrester may be lowered by providing a corresponding guide measure or apparatus.

On this basis, the present invention first provides the lightning protection apparatus for the wind generator blade, in which the lightning arrester and the lightning arrester base are both optimized in structure. First, the lightning arrester is directly connected to the lightning arrester base without an additional connector such as a bolt or a screw rod, such that the stability of connection between the lightning arrester and the lightning arrester base is effectively ensured, and the contact area between the lightning arrester and the lightning arrester base is enlarged. Secondly, the surface of the lightning arrester base of the lightning protection apparatus is coated with a stable insulation layer, and meanwhile, the corners of the lightning arrester base are all passivated (rounded or chamfered), such that the possibility that the lightning arrester base is directly struck by the lightning is avoided, because the inventor finds through research that compared with a sharp metal edge, the passivated, e.g. rounded or chamfered metal edge is greatly weakened in leading capability, thereby lowering the risk of lightning strikes. In a specific example, the rounded corner preferably has the following parameter: the radius of the rounded corner is 3 mm to 28 mm. The chamfered corner preferably has the following parameter: an angle of the chamfered corner is 100° to 165°. By using the rounding parameter within the above numerical range during rounding or chamfering, the risk of lightning strikes may be minimized through passivation. Finally, a threaded hole connected to the lightning arrester is reserved on the lightning arrester base, and a magnetic sheet is disposed for positioning and guiding, such that the difficulty in mounting and positioning of the lightning arrester is lowered, and the stability of connection between the lightning arrester and the lightning arrester base is further ensured. The solution of the present invention is further described below with reference to the embodiments and the accompanying drawings.

Figure 3:
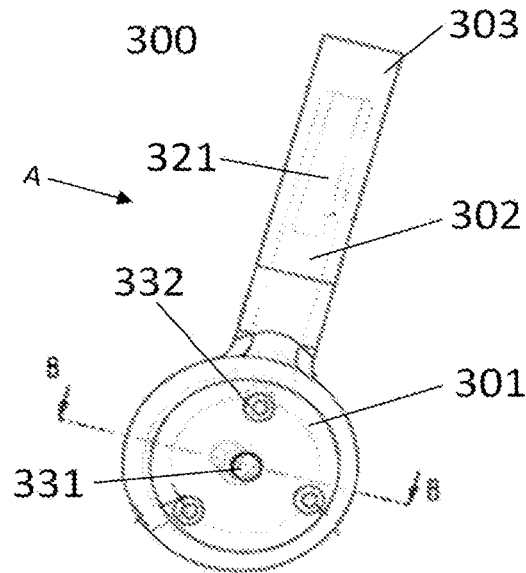
FIG. 3 shows a top view of a lightning arrester base according to one embodiment of the present invention.

FIG. 3 shows a top view of a lightning arrester base according to one embodiment of the present invention. As shown in FIG. 3, the lightning arrester base 300 is a metal part, which includes a base body that is a cylinder 301 herein, and a lead tube that is a round tube 302 herein, and the surface of the lightning arrester base is coated with the insulation layer 303. It should be pointed out herein that the cylindrical shape of the base body and the cylindrical tube shape of the lead tube are merely exemplary, and other shapes are also possible under the guidance of the present invention. A second through hole 331 is formed on the insulation layer 303. The second through hole 331 is configured to mount the lightning arrester, and therefore, the size of the second through hole 331 is preferably equal to or slightly greater than a sectional area of the lightning arrester. In one embodiment of the present invention, the second through hole 331 is preferably formed at a position of the insulation layer 303 corresponding to the center of the cylinder 301. One, two or more second through holes may be formed on the insulation layer of each the lightning arrester base. In order to ensure that the lightning arrester base can be fully bonded to the inner surface of the housing of the wind generator blade during mounting, in one embodiment of the present invention, at least one protrusion 332 is further disposed at each of positions of the insulation layer 303 corresponding to upper and lower surfaces of the cylinder 301. The protrusion 332 can ensure that there is an adhesive with sufficient thickness between the insulation layer and the inner surface of the housing of the wind generator blade. Meanwhile, for this purpose, a plurality of protrusions are preferably disposed on each side of the insulation layer, wherein the plurality of protrusions are distributed around the second through hole 331 in an equi-axial manner. It should be understood that in order to simplify a coating process for the insulation layer, it is also possible to first completely coat the lightning arrester base with the insulation layer when the insulation layer is formed, and then form the second through hole 331 by means of a drilling process or the like when the lightning arrester is mounted.

Figure 4:
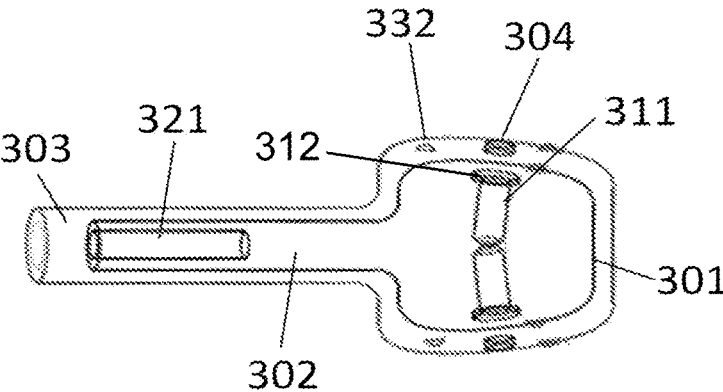
FIG. 4 shows a sectional view of a lightning arrester base according to one embodiment of the present invention as seen from a direction A in FIG. 3.
Figure 5:
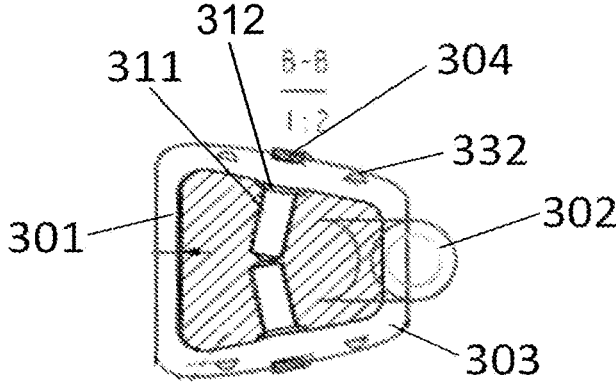
FIG. 5 shows a sectional view of a lightning arrester base according to one embodiment of the present invention along a section cutting line B in FIG. 3.

In order to better illustrate an internal structure of the lightning arrester base, FIG. 4 shows a sectional view of a lightning arrester base according to one embodiment of the present invention as seen from a direction AA in FIG. 3; and FIG. 5 shows a sectional view of a lightning arrester base according to one embodiment of the present invention, wherein the sectional view is obtained by section cutting along a section cutting line B-B in FIG. 3. As shown in FIG. 4, the round tube 302 is disposed on a side surface of the cylinder 301 and forms a smooth transition. Meanwhile, in order to further avoid the possibility that the lightning arrester base is directly struck by the lightning, in one embodiment of the invention, the corners of the lightning arrester base are all passivated, for example, rounded or chamfered. As shown in FIG. 4, a connecting structure for the down lead is disposed inside the round tube 302. In one embodiment of the present invention, a down lead crimping hole 321 is formed inside the round tube 302, and the down lead is crimped in the down lead crimping hole 321.

As shown in FIG. 4 and FIG. 5, at least one the threaded hole 311 is formed in the cylinder 301, and the threaded hole 311 is perpendicular to a first surface or a second surface of the cylinder 301, wherein the first surface or the second surface refers to a surface of the cylinder 301 in contact with the inner surface of the housing of the wind generator blade. The threaded hole 311 is adapted to a connecting portion of the lightning arrester. One, two or more threaded holes 311 may be formed. When one threaded hole is formed, the threaded hole 311 is preferably formed in the center of the first surface or the second surface of the cylinder 301. When two threaded holes are formed, the two threaded holes 311 are preferably formed in the centers of the first surface and the second surface of the cylinder 301, respectively. When more threaded holes are formed, the positions of the threaded holes may be set based on a mounting position of the lightning arrester. In order to facilitate the positioning during the mounting of the lightning arrester, magnetic sheets 304 are further disposed at positions of the insulation layer 303 corresponding to the threaded holes 311, such that the threaded holes 311 can be accurately positioned by an apparatus with a magnetic force such as a magnet during the mounting of the lightning arrester; and then second through holes 331 are formed in positions corresponding to the plurality of threaded holes 311, so as to ensure sufficient surface contact between the lightning arrester and the lightning arrester base. Meanwhile, as shown in FIG. 4, there is an angle between the first surface and the second surface of the cylinder 301 and an axis of the cylinder 301, and the angle is determined based on the mounting position of the lightning arrester base. In one embodiment of the present invention, the first surface and the second surface of the cylinder 301 are parallel to the inner surface of the housing of the wind generator blade in contact therewith.

Figure 6:
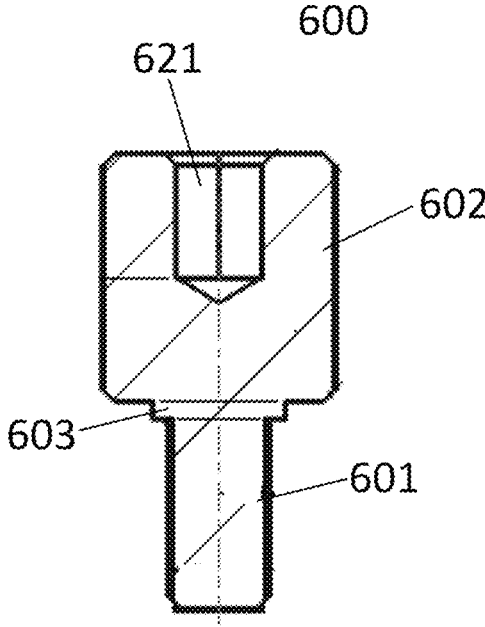
FIG. 6 shows a schematic structural diagram of a lightning arrester according to one embodiment of the present invention.

FIG. 6 shows a schematic structural diagram of a lightning arrester according to one embodiment of the present invention. In an embodiment of the present invention, in order to ensure sufficient surface contact between the lightning arrester and the lightning arrester base, the lightning arrester is manufactured by means of an integral forming process. As shown in FIG. 6, the lightning arrester 600 is a metal part, which includes the connecting portion 601 and a lightning arresting portion 602, wherein the connecting portion 601 is configured to be connected to the lightning arrester base, and in corresponding to the threaded hole 311 in the lightning arrester base, an external thread is formed on a surface of the connecting portion 601 to adapt to the threaded hole 311. In order to enlarge the contact area between the lightning arrester and the lightning arrester base, in one embodiment of the present invention, a sectional area of the lightning arresting portion 602 is preferably greater than a sectional area of the connecting portion 601.

Figure 7:
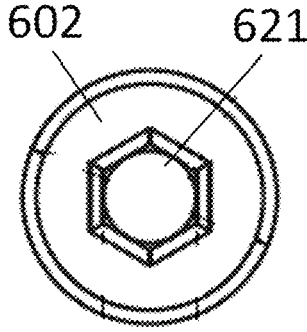
FIG. 7 shows a top view of a lightning arrester according to one embodiment of the present invention.

As shown in FIG. 6, in order to further improve the accuracy of connection and positioning, for example, a stepped positioning portion 603 is disposed at the connecting portion 601, for example, between the connecting portion 601 and the lightning arresting portion 602, such that after the connecting portion 601 is fully screwed into the threaded hole 311, the bottom surface of the lightning arresting portion 602 is in large-area contact with the surface of the lightning arrester base in a shape fit manner, which reliably avoids a gap, thus forming a reliable lightning current transmission path between the lightning arrester and the lightning arrester base, and avoiding the problem such as arc discharge or melting between the lightning arrester and the lightning arrester base that easily causes damage to the wind generator blade; meanwhile, the positioning portion may also implement alignment between the connecting portion and the threaded hole. A cross section 603 of the positioning portion may be in various shapes, such as a stepped shape, a serrated shape, a wavy shape, and other concave-convex shapes, as long as the shape can facilitate reliable contact between the connecting portion 601 and the lightning arrester base or enlarge the contact area, in order to fit with a recess 312 in the corresponding shape at the top of the threaded hole. In addition, the positioning portion 603 may also implement alignment between the connecting portion 601 and the lightning arrester base, that is, it can only be confirmed that the bolt has been completely mounted in place when the two are completely matched or engaged, otherwise, it is required to remount the bolt or adjust a connection direction of the bolt. In order to facilitate mounting operation and enlarge a receiving area of the lightning arresting portion 602 to the lightning, in one embodiment of the present invention, a mounting hole 621 is further formed on the lightning arresting portion 602, and the mounting hole 621 extends vertically downwards from an upper surface of the lightning arresting portion 602. Due to the use of an inner hexagonal wrench for mounting, the mounting hole 621 is preferably in an inner hexagonal shape, as shown in FIG. 7, but it should be understood that in other embodiments of the present invention, the shape and size of the mounting hole may be adjusted based on actually used mounting tools.

Figure 8:
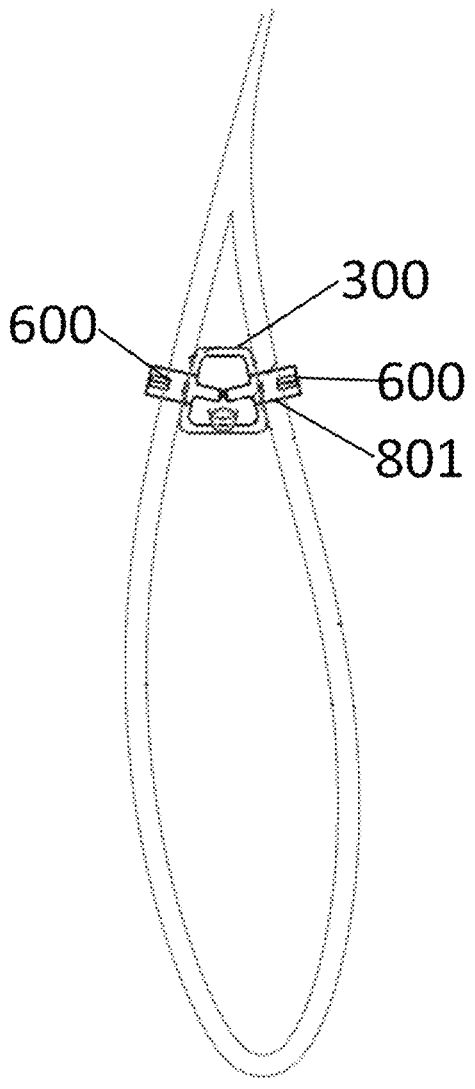
FIG. 8 shows a schematic diagram in which a lightning protection apparatus for a wind generator blade according to one embodiment of the present invention is mounted on the wind generator blade.

FIG. 8 shows a schematic diagram in which a lightning protection apparatus for a wind generator blade according to one embodiment of the present invention is mounted on the wind generator blade. As shown in FIG. 8, the lightning protection apparatus is mounted at the trailing edge of the wind generator blade, wherein the lightning arrester base 300 is mounted between a suction surface and a pressure surface at the trailing edge of the wind generator blade. As shown in FIG. 8, the first surface and the second surface of the lightning arrester base 300 are attached to the inner surface of the housing of the wind generator blade, which lowers the difficulty in mounting. The lightning arrester 600 is connected to the threaded hole preformed on the lightning arrester base 300 through a first through hole 801 on the wind generator blade, and the lightning arresting portion of the lightning arrester 600 is partially disposed on the suction surface and the pressure surface at the trailing edge of the wind generator blade.

Figure 9:
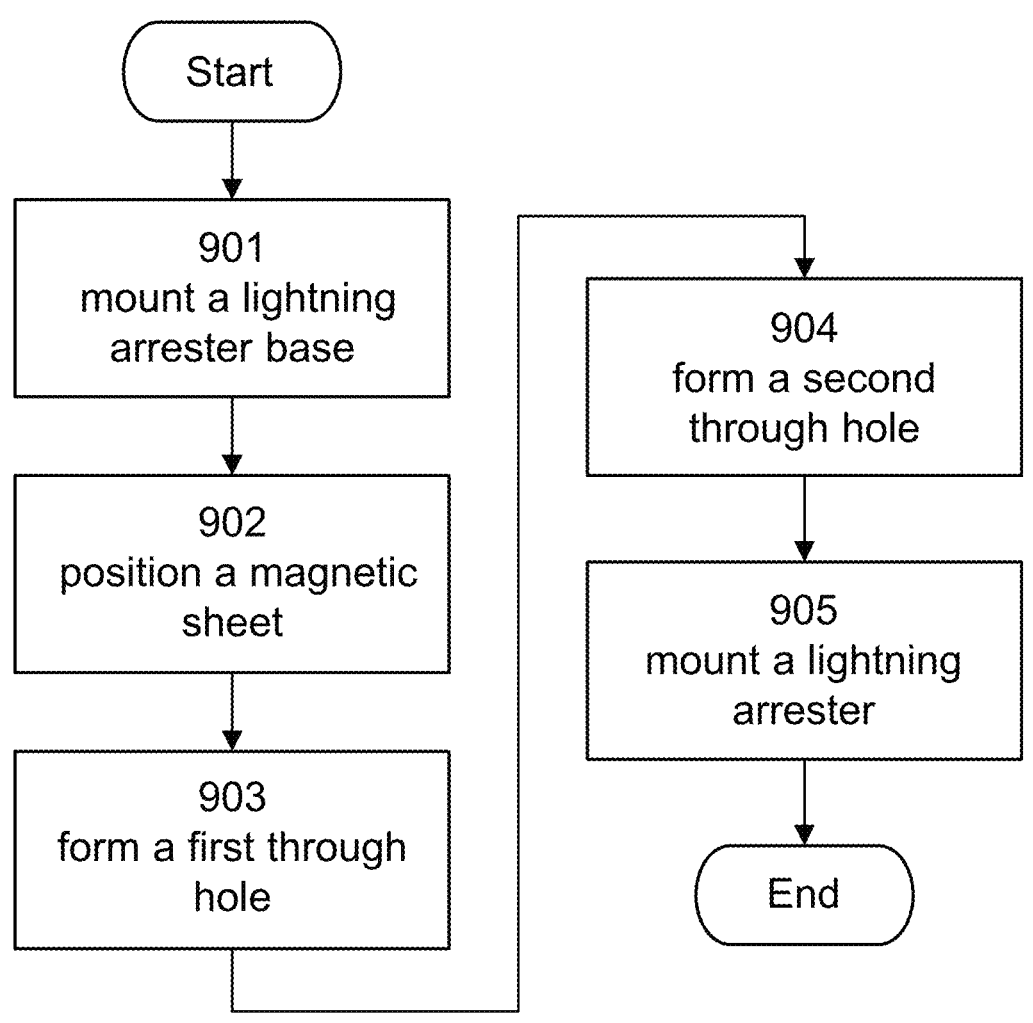
FIG. 9 shows a schematic flowchart of a mounting method for a lightning protection apparatus for a wind generator blade according to one embodiment of the present invention.

FIG. 9 shows a schematic flowchart of a mounting method for a lightning protection apparatus for a wind generator blade according to one embodiment of the present invention. As shown in FIG. 9, a mounting method for the lightning protection apparatus for the wind generator blade includes the following steps.

First, in step 901, mount the lightning arrester base. During infusion of the wind generator blade, the lightning arrester base coated with the insulation layer is mounted inside the wind generator blade. In one embodiment of the present invention, the lightning arrester base is bonded to the inner surface of the housing of the wind generator blade by a bonding material. Due to the fact that protrusions are disposed on the insulation layer, it can be ensured that all parts of the insulation layer are coated with the bonding material with a certain thickness. Meanwhile, the first surface and the second surface of the lightning arrester base are parallel to the inner surface of the housing of the wind generator blade at the corresponding position, and therefore, it can be effectively ensured that the lightning arrester base is reliably bonded to the inner surface of the housing of the wind generator blade. Before the lightning arrester base is coated with the insulation layer, the down lead needs to be crimped on the lightning arrester base, and then the lightning arrester base is coated with an insulation material. The insulation material also needs to coat a connection between the lightning arrester base and the down lead, but does not fill the threaded hole. After the insulation material is disposed, the magnetic sheet is mounted at a position corresponding to the threaded hole.

Secondly, in step 902, position the magnetic sheet. After the wind generator blade is demolded, a position of the magnetic sheet on the lightning arrester base is determined by using a magnet or another device or apparatus with a magnetic force outside the wind generator blade, and then a position of the threaded hole is determined, thereby facilitating drilling on the wind generator blade and the insulation layer.

Thirdly, in step 903, form the first through hole. The first through hole is formed on a position of the wind generator blade corresponding to the magnetic sheet. Because the lightning arresting portion of the lightning arrester is only partially exposed to the wind generator blade, a diameter of the first through hole should be greater than or equal to the sectional area of the lightning arresting portion of the lightning arrester.

Fourthly, in step 904, form the second through hole. The second through hole is formed on the insulation layer of the lightning arrester base through the first through hole. In order to ensure that the lightning arrester can be in sufficient contact with the first surface or the second surface of the lightning arrester base, a diameter of the second through hole should be greater than or equal to the sectional area of the lightning arresting portion of the lightning arrester and is preferably equal to the diameter of the first through hole. During the process, the magnetic sheet is removed.

Finally, in step 905, mount the lightning arrester. The lightning arrester is mounted in the threaded hole of the lightning arrester base. When the mounting hole is formed on the lightning arrester, the lightning arrester may be screwed into the lightning arrester base, for example, by a tool such as a hexagonal wrench.

The lightning protection apparatus as shown above may be suitable for various types of the wind generator blades. At least one the lightning protection apparatus may be mounted on the wind generator. For example, one lightning protection apparatus is preferably mounted at the trailing edge of each the wind generator blade. When a charged cloud layer approaches the wind generator blade, the exposed lightning arrester releases an upward leader with the better advantage of lightning arresting under the action of the charged cloud layer. However, the lightning arrester base coated with the insulation layer inside the wind generator blade is not liable to release the upward leader or can only release the upward leader free from the advantage of lightning arresting. There- fore, the upward leader with the advantage of lightning arresting released from the surface of the lightning arrester is preferentially connected to a downward leader of the charged cloud layer, thereby starting a discharge process of the lightning arrester, that is, a lightning strike process. Other parts of the wind generator blade and the lightning arrester base are protected from lightning strikes.

After discharge on the lightning arrester, a current is conducted from a lower surface of the lightning arrester to an upper surface of the lightning arrester base, then is conducted between a thread of the lightning arrester and the threaded hole of the lightning arrester base, then is conducted from the lightning arrester base to the down lead that is connected to a flange of the wind generator blade or a hub of the wind generator, and then is transmitted to the ground through a nacelle and a tower from the hub to complete the discharge process of the lightning, thereby protecting the wind generator blade from lightning damage. Due to suffi- cient surface contact, a sufficiently high current can be conducted, and there will be no flashover between the lightning arrester and the lightning arrester base. Too much heat is not generated in the current conduction process itself, such that the wind generator blade is not damaged.

While the embodiments of the present invention have been described above, it should be understood that they are presented only as examples and not as a limitation. Appar- ently, those skilled in the relevant field may make various combinations, modifications, and changes to the embodi- ments without departing from the spirit and scope of the present invention. Therefore, the width and scope of the present invention disclosed herein should not be limited by the exemplary embodiments disclosed above, and should be defined only based on the appended claims and their equiva- lent substitutions.

What is claimed is:

1. A lightning protection apparatus for a wind generator blade, comprising:
    a lightning arrester, comprising:
        a lightning arresting portion configured to arrest a lightning;
        a connecting portion configured to be connected to a lightning arrester base, wherein the connecting por- tion is provided with an external thread; and
        a positioning portion disposed between the connecting portion and the lightning arresting portion, wherein the positioning portion is constructed so that after the connecting portion is screwed into a threaded hole, the positioning portion is capable of fitting with a recess in the threaded hole in shape; and
    wherein the lightning arrester base is configured to be connected to the lightning arrester and lead out a lightning current received by the lightning arrester during lightning arresting, wherein the lightning arrester base comprises:
        an insulation layer disposed on a surface of the light- ning arrester base; and
        at least one threaded hole formed on a base surface of the lightning arrester base facing the wind generator blade, wherein a length direction of the threaded hole is perpendicular to the base surface, and the threaded hole fits with the external thread, wherein the recess capable of fitting with the positioning portion in shape is provided at an end part of the threaded hole close to the base surface; and
    a down lead connecting portion configured to be in crimp connection with a down lead.

2. The lightning protection apparatus according to claim 1, wherein a magnetic body is disposed at a position of the threaded hole.

3. The lightning protection apparatus according to claim 1, wherein the lightning arrester base comprises:
    a base body on which the at least one threaded hole is formed; and
    a lead tube disposed on a side surface of the base body, forming a smooth transition, and configured to be connected to the down lead.

4. The lightning protection apparatus according to claim 3, wherein the lightning arresting portion of the lightning arrester is provided with a mounting hole;
    the base body is cylindrical;
    the lead tube is cylindrical; and/or
    a cross section of the positioning portion and a cross section of the recess are stepped, serrated, or wavy.

5. The lightning protection apparatus according to claim 4, wherein the mounting hole is an inner hexagonal mount- ing hole.

6. The lightning protection apparatus according to claim 1, wherein a sectional area of the connecting portion of the lightning arrester is less than a sectional area of the lightning arresting portion.

7. The lightning protection apparatus according to claim 1, wherein there is an angle between the base surface and an axis of the lightning arrester base, and the angle is deter- mined based on a mounting position of the lightning arrester base.

8. The lightning protection apparatus according to claim 1, wherein the base surface is parallel to an inner surface of the wind generator blade in contact therewith.

9. The lightning protection apparatus according to claim 1, wherein at least one protrusion is disposed on a surface of the insulation layer in contact with the wind generator blade.

10. The lightning protection apparatus according to claim 3, wherein the lead tube comprises a down lead crimping hole, and the down lead is crimped in the down lead crimping hole.

11. A mounting method for the lightning protection appa- ratus according to claim 1, comprising the following steps:
    during infusion of the wind generator blade, mounting the lightning arrester base inside the wind generator blade;
    after the wind generator blade is demolded, positioning the threaded hole outside the wind generator blade;
    forming a first through hole on a position of the wind generator blade corresponding to the threaded hole, a diameter of the first through hole is greater than or equal to a sectional area of the lightning arresting portion of the lightning arrester;
    forming a second through hole on the insulation layer of the lightning arrester base through the first through hole, a diameter of the second through hole is greater than or equal to a sectional area of the lightning arresting portion of the lightning arrester; and
    mounting the lightning arrester in the threaded hole of the lightning arrester base, such that the positioning portion of the lightning arrester fits with the recess of the threaded hole in shape.

12. A mounting method for the lightning protection appa- ratus according to claim 2, comprising the following steps:
    during infusion of the wind generator blade, mounting the lightning arrester base inside the wind generator blade;

after the wind generator blade is demolded, determining a position of the magnetic body on the lightning arrester base by using a magnet outside the wind generator blade;

forming a first through hole on a position of the wind generator blade corresponding to the magnetic body, a diameter of the first through hole is greater than or equal to a sectional area of the lightning arresting portion of the lightning arrester;

forming a second through hole on the insulation layer of the lightning arrester base through the first through hole, a diameter of the second through hole is greater than or equal to a sectional area of the lightning arresting portion of the lightning arrester; and mounting the lightning arrester in the threaded hole of the lightning arrester base.

13. The mounting method according to claim 11, wherein the lightning arrester base is mounted between a suction surface and a pressure surface at a trailing edge of the wind generator blade.

14. The mounting method according to claim 11, wherein the lightning arrester base is bonded to an inner surface of a housing of the wind generator blade by a bonding material.

15. A wind generator, wherein at least one of the lightning protection apparatus according to claim 1 is mounted on the wind generator blade.

\* \* \* \* \*